(12) United States Patent
Hussain

(10) Patent No.: US 7,476,355 B2
(45) Date of Patent: Jan. 13, 2009

(54) BLOW MOLDING APPARATUS AND METHOD

(75) Inventor: Tasadduq Hussain, Maumee, OH (US)

(73) Assignee: Rexam Healthcare Packaging Inc., Perrysburg, OH (US)

( * ) Notice: Subject to any disclaimer, the term of this patent is extended or adjusted under 35 U.S.C. 154(b) by 757 days.

(21) Appl. No.: 10/989,783

(22) Filed: Nov. 15, 2004

(65) Prior Publication Data

US 2006/0103056 A1    May 18, 2006

(51) Int. Cl.
*B29C 49/30* (2006.01)
(52) U.S. Cl. ..................................... 264/538
(58) Field of Classification Search ................ 264/538
See application file for complete search history.

(56) References Cited

U.S. PATENT DOCUMENTS

| | | | |
|---|---|---|---|
| 3,324,509 A | 6/1967 | Hey et al. | |
| 3,807,923 A * | 4/1974 | Cannon et al. | 425/533 |
| 4,063,867 A | 12/1977 | Janniere | |
| 4,106,886 A | 8/1978 | Sokolow | |
| 4,151,247 A | 4/1979 | Hafele | |
| 4,285,657 A | 8/1981 | Ryder | |
| 4,313,905 A * | 2/1982 | Hafele | 264/532 |
| 4,323,341 A | 4/1982 | Valyi | |
| 4,473,515 A | 9/1984 | Ryder | |
| 4,929,450 A * | 5/1990 | Takakusaki et al. | 425/526 |
| 5,169,654 A | 12/1992 | Koga | |
| 5,206,039 A * | 4/1993 | Valyi | 425/526 |
| 5,261,809 A | 11/1993 | Koga | |
| 5,362,437 A | 11/1994 | Koga | |
| 5,552,105 A * | 9/1996 | Konefal | 264/538 |
| 5,744,176 A | 4/1998 | Takada et al. | |

FOREIGN PATENT DOCUMENTS

EP    0534367    3/1993

\* cited by examiner

*Primary Examiner*—Suzanne E. McDowell
(74) *Attorney, Agent, or Firm*—Reising, Ethington, Barnes, Kiselle, P.C.

(57) ABSTRACT

An injection blow molding apparatus has a rotatable turret with three laterally facing faces. The turret is rotatable between an injection position, a blow position and an ejection position that are angularly spaced from each other around an axis of rotation of the turret. A mold core holder is mounted on each face of the turret. Each core holder has a track, a wing pivotally mounted on each end of the track for movement between folded positions overlying the track at the injection position, and unfolded positions extending from the ends of the track at the blow and ejection positions. Mold cores are mounted on each track at a reduced spacing. The spacing can be increased by moving the wings to the extended positions and spreading out the mold cores on the track and the two wings.

3 Claims, 5 Drawing Sheets

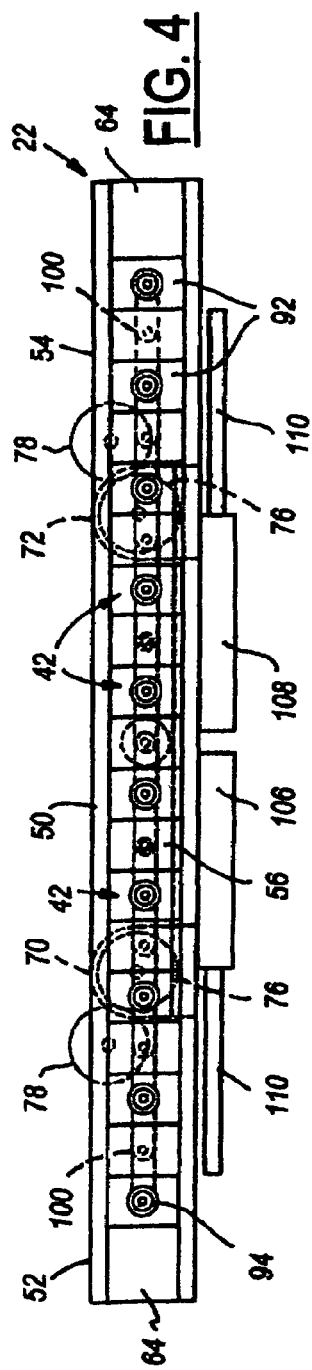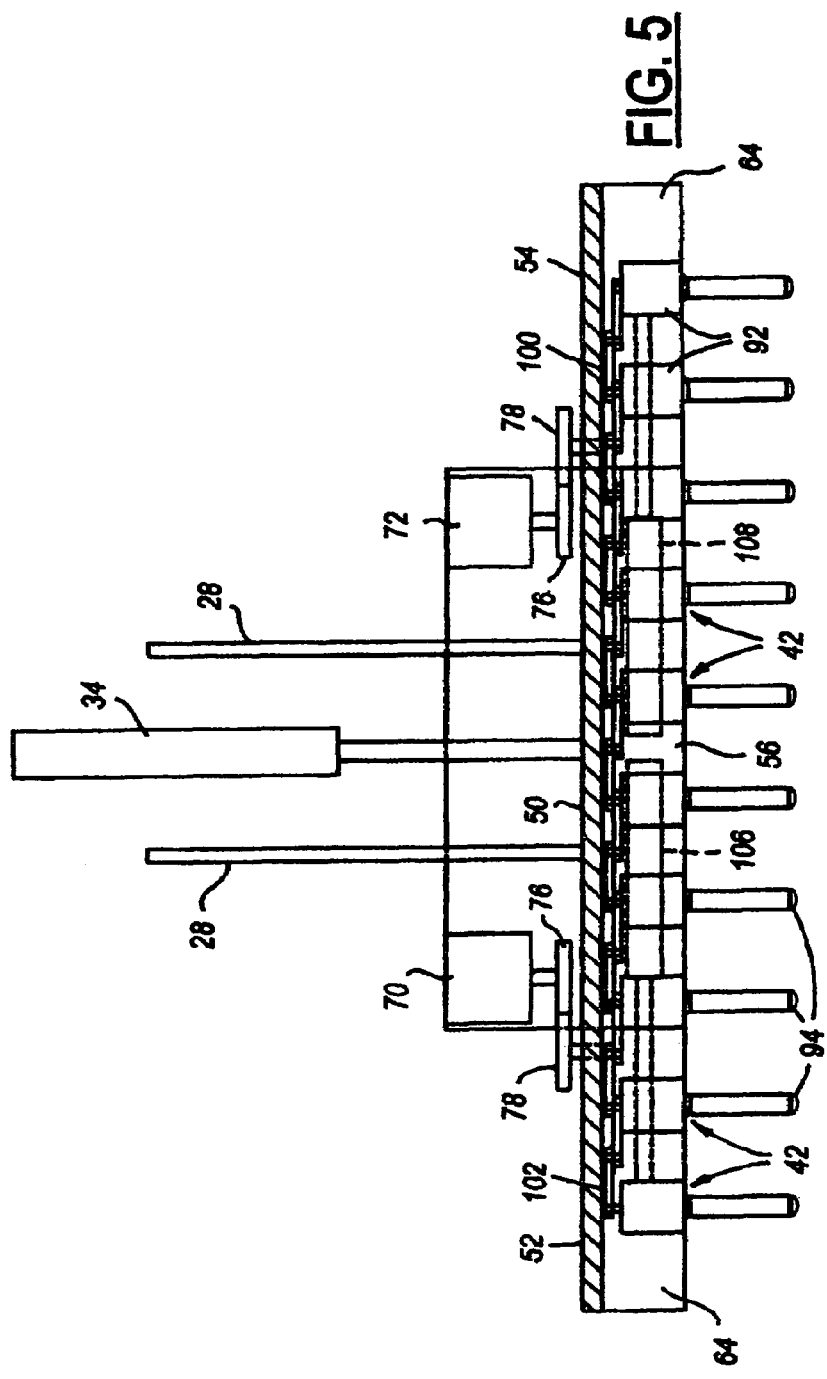

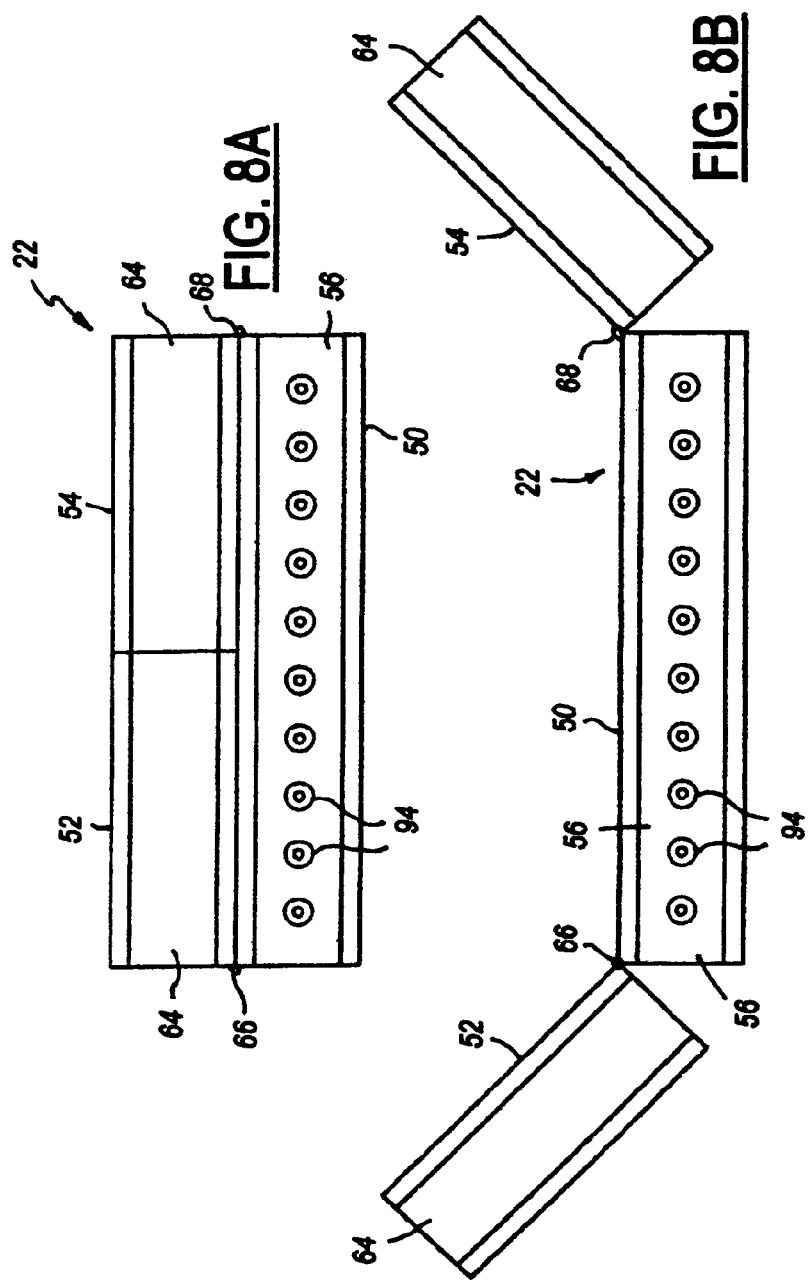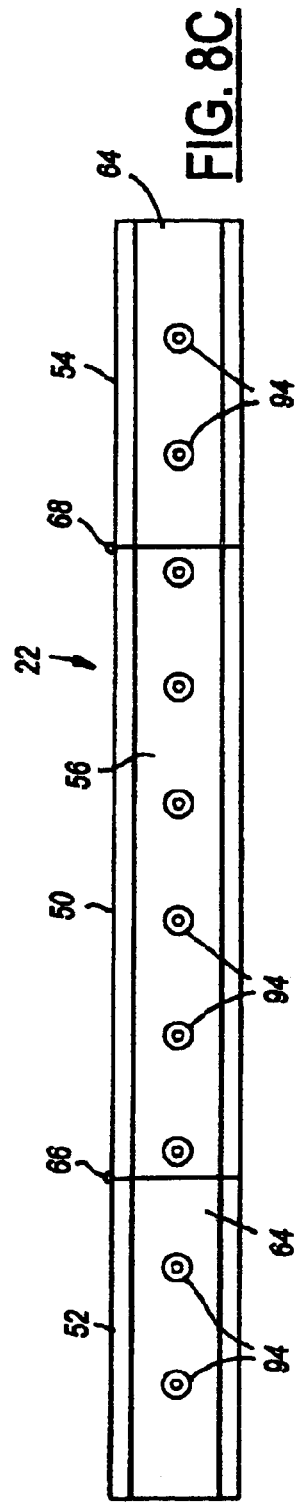

BLOW MOLDING APPARATUS AND METHOD

FIELD OF THE INVENTION

This invention relates generally to blow molding apparatus which may be of the single-stage injection blow molding type or the injection stretch blow molding type, and to a method of blow molding.

BACKGROUND OF THE INVENTION

The present disclosure refers to a single-stage injection blow molding system or injection stretch blow molding system. In these types of systems, a plurality of mold cores is carried on the several faces of a rotatable turret. The turret indexes in sequence between an injection position, a blow position and an ejection position. Preforms are molded on the mold cores at the injection position, and the preforms are formed into finished articles at the blow position. In prior systems, the spacing between the mold cores on the turret is dictated by the spacing required between blow molds at the blow position. This means that the spacing between the mold cores at the injection position typically is much greater than needed.

SUMMARY OF THE INVENTION

In accordance with the present invention, a plurality of mold cores is mounted on each face of a rotatable turret. The mold cores are movable between a first spacing at the injection position and a second spacing, greater than the first spacing, at the blow and ejection positions.

More specifically, in the preferred embodiment, the cores on each turret face are mounted on a core holder in the form of an elongated linear track with a wing pivotally mounted on each end of the track. At the injection position, the cores are compacted onto the track and the wings are folded over the track. At the blow position, the wings are extended so that some of the cores can be moved onto the wings, permitting the spacing between the cores to be expanded.

One object of this invention is to provide a blow molding apparatus and method having the foregoing features and capabilities.

BRIEF DESCRIPTION OF THE DRAWINGS

Other objects, features, advantages and aspects of the present invention will be apparent from the following detailed description of the preferred embodiment and best mode, appended claims and accompanying drawings in which:

FIG. 4 is a view similar to FIG. 2, but showing the wings of the core holder extended;

FIG. 5 is a top view, with parts in section, of the core holder shown in FIG. 4;

FIGS. 8A, 8B and 8C are diagrammatic views showing different positions of the wings relative to the track of a core holder.

DETAILED DESCRIPTION OF THE PREFERRED EMBODIMENT

Referring now more particularly to the drawings, there is shown an injection blow molding apparatus 10 including a turret 12 rotatable on a central axis by a motor (not shown). The turret 12 in this preferred embodiment is triangular in shape, having three laterally outwardly directed faces 16, 18 and 20. In other embodiments, the turret could be square, for example, in a system in which the preform is subjected to a second injection stage, or in which the preform or container is subjected to a conditioning stage. The present invention can readily be implemented in such other embodiments.

Figure 1:
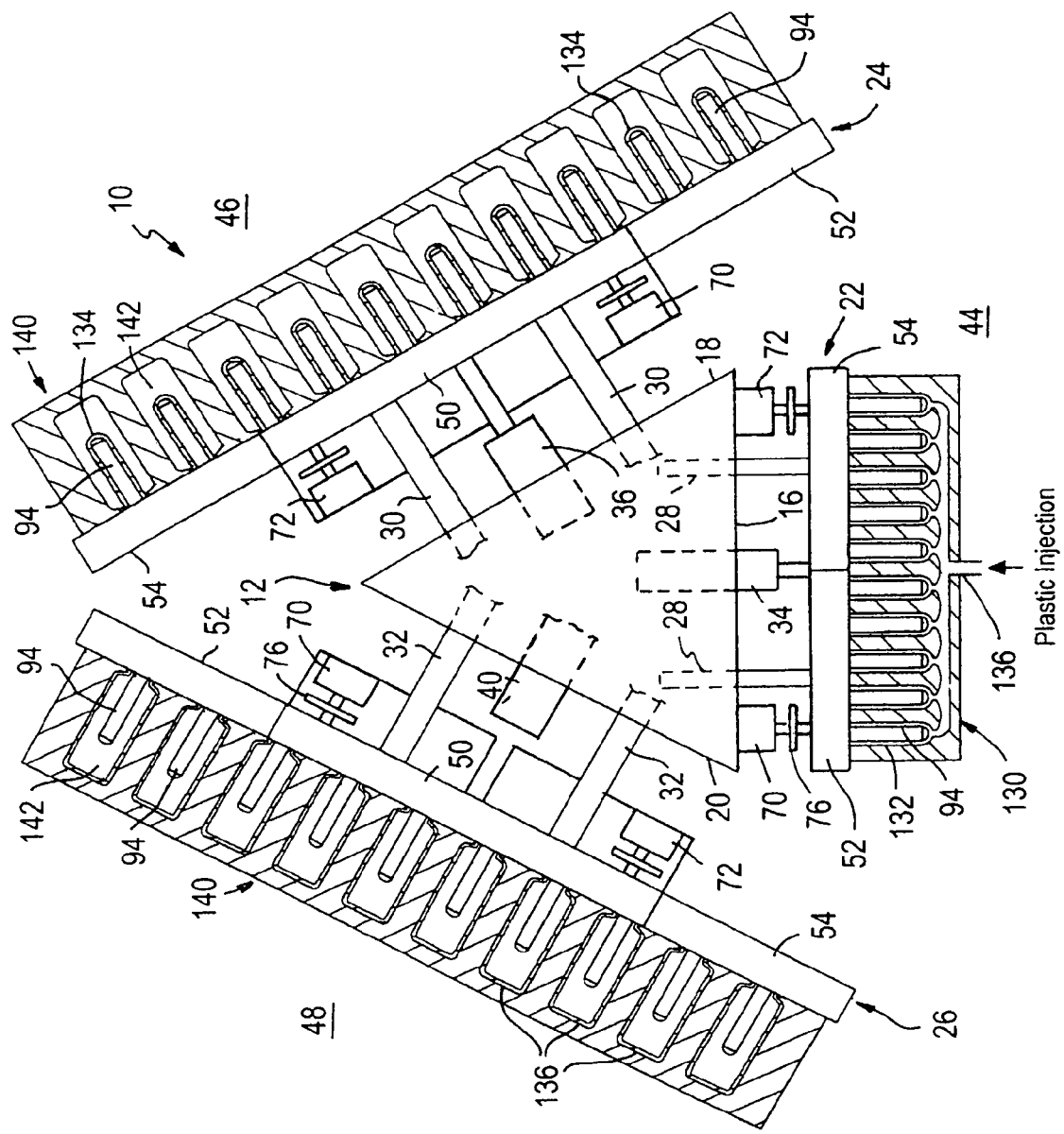
FIG. 1 is a top plan view of an injection blow molding apparatus constructed in accordance with the invention.

Core holders 22, 24 and 26 are mounted on the respective faces 16, 18 and 20 by support bars 28, 30 and 32. The support bars are axially slidably mounted on the turret 12 so that the core holders 22, 24 and 26 can be moved radially inwardly and radially outwardly. In FIG. 1, the core holder 22 is shown in a radially inner position, and core holders 24 and 26 are shown in radially outer positions. Cylinders 34, 36 and 40 in the turret 12 are provided to individually move the core holders 22, 24 and 26 to their radially inner and radially outer positions.

Mold cores 42 are mounted on the core holders, as will be explained more fully hereinafter.

The turret 12 is rotatable between an injection position 44, a blow position 46 and an ejection position 48 located at angularly spaced positions around the turret 12. The turret 12 is shown in FIG. 1 in a position in which the turret face 16 is facing the injection position 44, the turret face 18 is facing the blow position 46, and the turret face 20 is facing the ejection position 48.

Each of the core holders 22, 24 and 26 preferably has an elongated track 50, a wing 52 at one end of the track and a wing 54 at the opposite end of the track. Each track 50 comprises a channel 56. Each of the wings 52 and 54 comprises a channel 64, shaped the same in cross section as the channel of the track 50.

The wings 52 and 54 are pivoted to the opposite ends of the track 50 of each of the core holders 22-26 by hinges 66 and 68 for swinging movement from a folded position overlying the track 50 (see FIGS. 1-3) to an extended position extending in a straight-line continuation of the track (see FIGS. 1 and 4-6). Also, see FIGS. 8A-8C showing diagrammatically the wings folded (FIG. 8A), the wings extended (FIG. 8C) and the wings in an intermediate position (FIG. 8B).

The wings 52 and 54 of each core holder 22-26 are pivoted between their folded positions overlying the track 50 and their extended positions by a power source comprising actuators 70 and 72. Each actuator may be in the form of a motor having a shaft 74 provided with a gear 76 in mesh with a gear 78 affixed to one of the wings. Each motor is capable of rotating the associated gear 76 in one direction or the other to fold or extend the associated wing.

The mold cores 42 are slidably mounted in a linear series in the channel 56 of each track 50. Each mold core includes a mold core body or block 90 and a core rod 92. Each body 90 has a passage 94. A retaining strip 96 on the body 90 engages a collar 98 on each core rod 92 to retain the core rods in the body 90.

Figure 2:
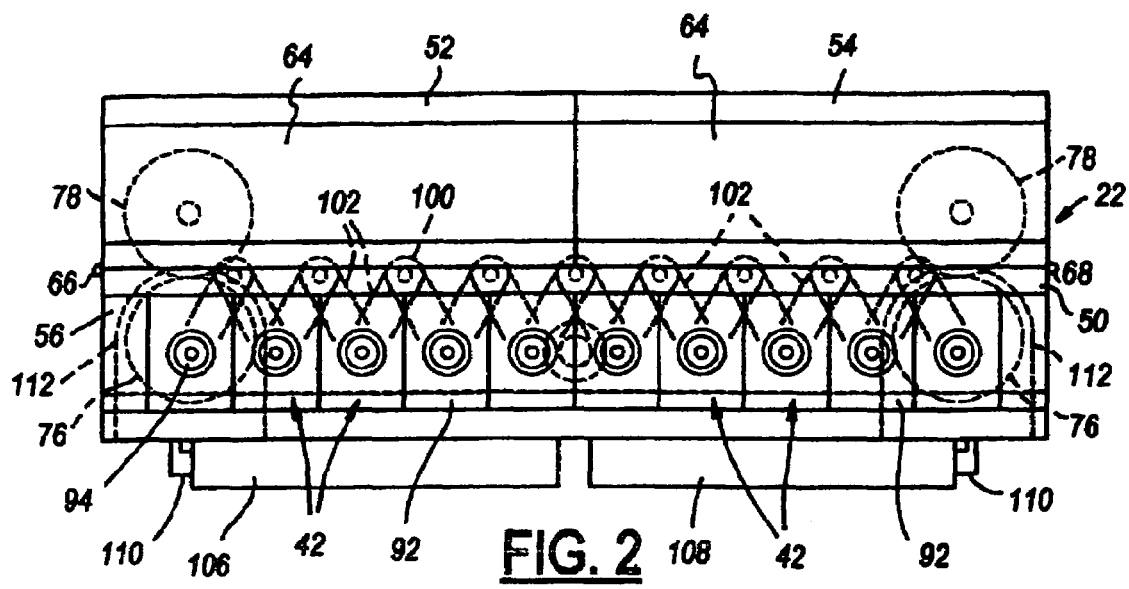
FIG. 2 is a front view of one of the core holders of the apparatus shown in FIG. 1, with the wings of the core holder folded over the track thereof.
Figure 3:
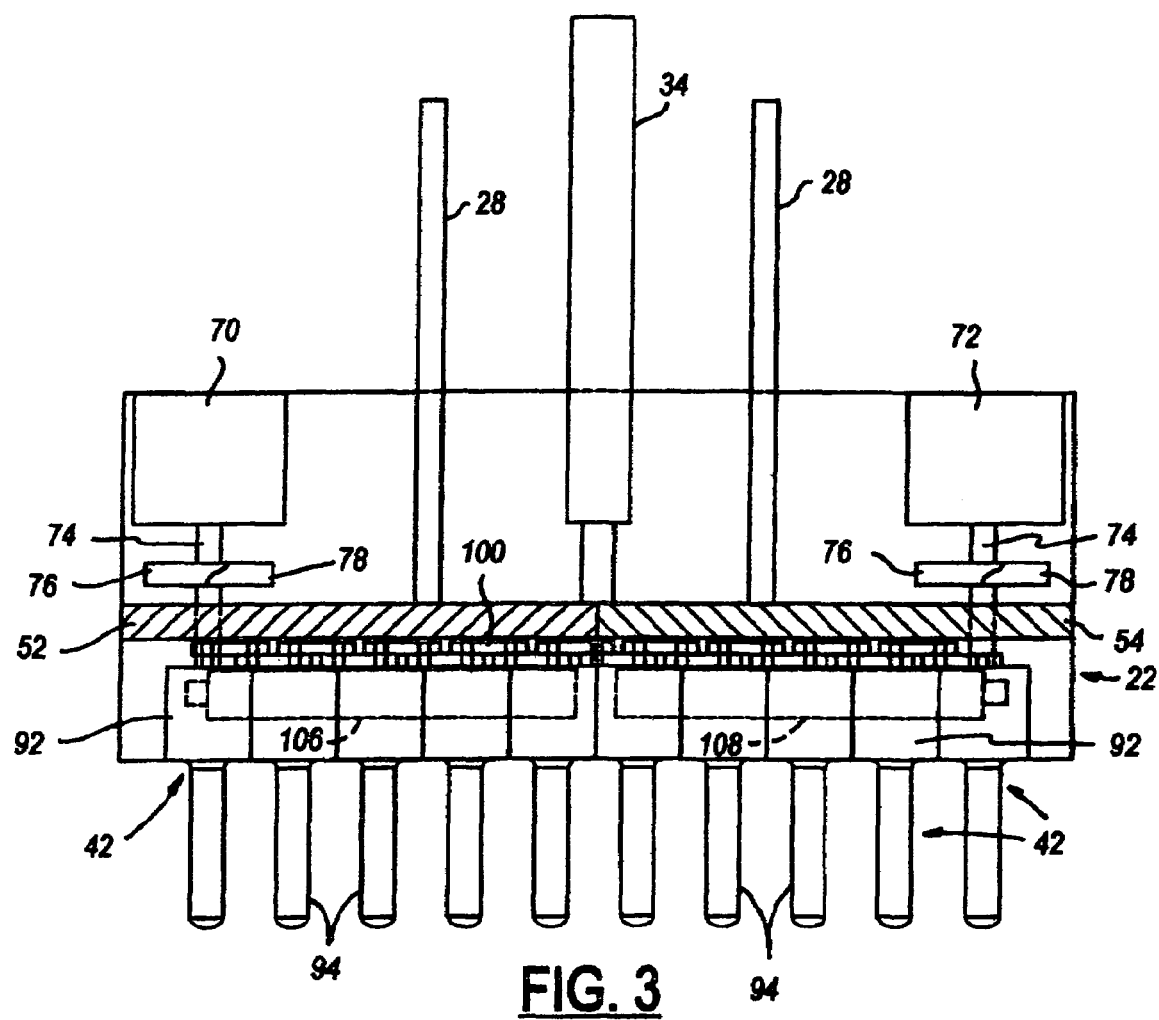
FIG. 3 is a top view, with parts in section, of the core holder shown in FIG. 2.

The mold cores 42 of each core holder are linked together by a linkage 100 comprising links 102 pivoted to the core bodies 90 and to each other. FIGS. 2 and 3 show the core bodies 90 compacted together in contact with one another on the track 50. This may be considered a minimum or first spacing of the mold cores. When the wings 52, 54 are in the extended position, at least the end most two mold cores 42 can be slid from the channel 56 of the track 50 into the channels 64 of the wings so that the mold cores can be spread out along the track and the two wings, (see FIGS. 4-6). This may be considered a maximum or second spacing of the mold cores. The linkage 100 maintains an equal spacing of the mold cores 42 at all times.

The mold cores 42 of each of the core holders are moved from the compacted position to the extended position by a drive, comprising fluid cylinders 106 and 108 each of which has a piston rod 110 connected to a core support 112 carrying an end-most one of the series of mold cores.

A mold 130 is shown in FIG. 1 at the injection position 44 having mold cavities 132 in which plastic preforms 134 are to be formed. The cavities 132 are spaced apart the same distance as the mold core rods 92 when the mold cores are at the minimum spacing on the track 50 as shown in FIG. 3. The mold 130 has an inlet 136 for the injection of the plastic needed for making the preforms.

A blow mold 140 is shown at positions 46 and 48. The mold 140 has cavities 142 in which articles, such as the bottles 138, are formed. The cavities 142 are spaced apart the same distance as the mold core rods 92 when the mold cores 42 are at the maximum spacing.

Figure 6:
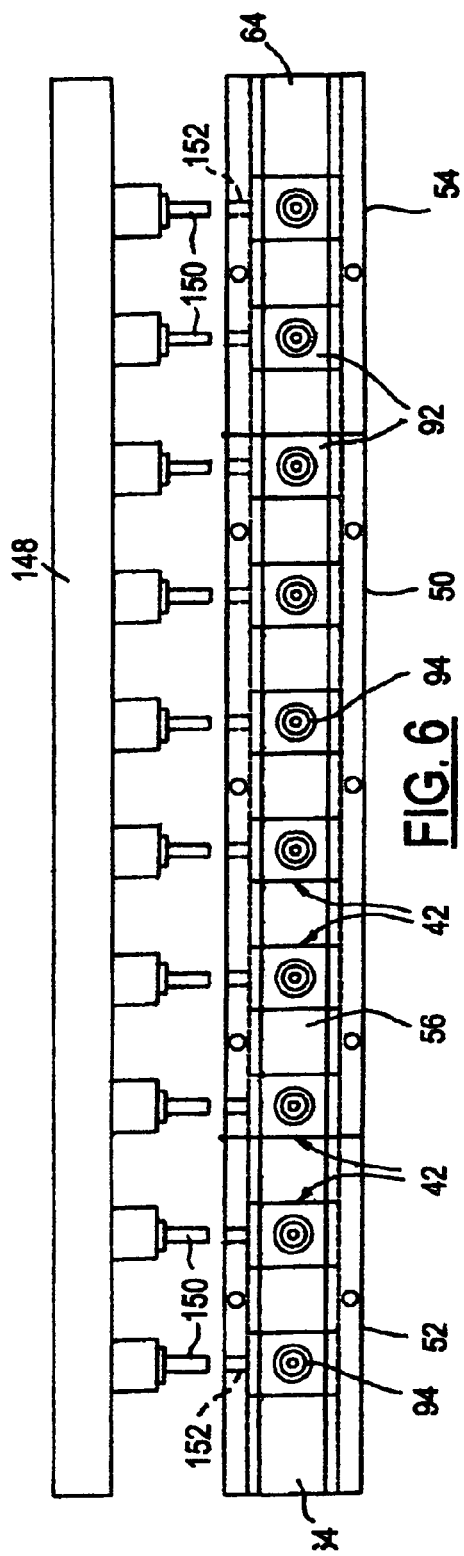
FIG. 6 is a front view of a core holder with the wings extended, shown at the blow station.
Figure 7:
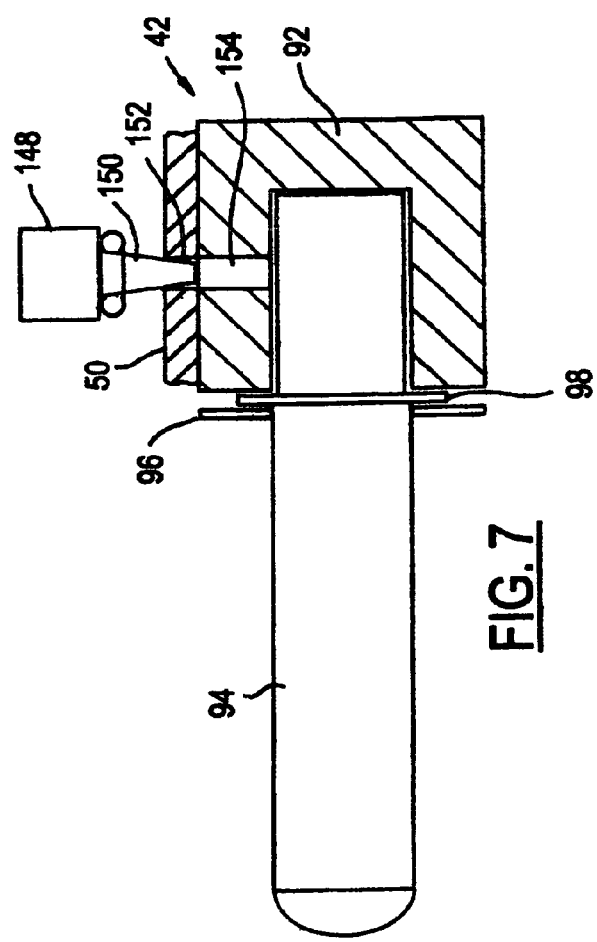
FIG. 7 is a detail view, partly in section, of a mold core.

FIG. 6 shows a blow mold manifold 148 at the blow mold position 46. The blow mold manifold 148 has nozzles 150 respectively aligned with passages 152 in the channel 56 of the track 50 and in the channels 64 of the wings 52 and 54 when one of the core holders is at the blow position. The passages 152 in the channel 56 are aligned with the passages 94 in the respective mold core bodies 90 when the mold cores 42 are at maximum spacing shown in FIGS. 5 and 6. Air under pressure from the air manifold 148 is injected through the passages 152 and 94 into the cavities 142 of the mold 140 to expand the preforms to the shape of the cavities.

In operation, the core holder 22 is shown at the injection position 44 with the core rods 92 of the mold cores 42 projecting into the respective cavities 132 of the mold 130. At this time, all of the mold cores are at the minimum spacing on the track 50 and the wings 52, 54 are folded over the track. Liquid plastic is injected through the inlet 136 into the mold cavities to form the preforms 134 on the core rods 92. The mold 130 is separated from the core holder 22 with the preforms 134 remaining on the core rods 92, and the turret is rotated to present the core holder to the blow position 46.

At the blow position 46, the wings 52, 54 are extended by operation of the motors 70 and 72, and the mold cores are spread out to their maximum spacing along the track 50 and along both wings 52, 54 by operation of the cylinders 106 and 108. The core holder 22 is moved to its radially outer position by operation of the cylinder 34 into contact with the mold 140 with the core rods 92 with preforms 134 thereon projecting into the respective cavities 142. The blow mold manifold 148 is moved toward the core holder to project the manifold nozzles 150 into the passages 152 and inject air under pressure through the passages 94 in the core bodies 90 and into the cavities 142 to blow the preforms 134 into bottles in the shape of the cavities 142, and is then retracted.

At the conclusion of blowing the bottles, the turret 12 is rotated to the eject position 48, the mold 140 is opened, and the bottles are ejected. The operation is repeated in sequence for the other core holders as the turret is rotated.

There have thus been disclosed a blow-molded plastic container and method of manufacture that fully satisfy all of the objects and aims previously set forth. The invention has been disclosed in conjunction with a presently preferred embodiment thereof, and a number of modifications and variations have been discussed. Other modifications and variations will readily suggest themselves to persons of ordinary skill in the art in view of the foregoing description. The invention is intended to embrace all such modifications and variations as fall within the spirit and broad scope of the appended claims.

The invention claimed is:

1. A method of forming plastic articles by blow molding comprising the steps of molding preforms on a plurality of mold cores while maintaining the mold cores in a first spacing between the mold cores, spreading the mold cores with the preforms thereon farther apart to a second increased spacing, and blow molding the plastic articles from the preforms on said mold cores while maintaining the mold cores at said second increased spacing, wherein said mold cores are movably supported on a mold core holder having a track and a wing pivoted on each end of said track, pivoting the wings to positions overlying the track and supporting the mold cores on said track in said first spacing during the molding of the preforms on the mold cores, and thereafter pivoting the wings to positions extending from the ends of the track and supporting the mold cores on said track and on said wings in said second spacing during the blow molding of the plastic articles.

2. The method set forth in claim 1 wherein said core holder is mounted on a rotatable turret, and rotating said turret to present said core holder to an injection position for the molding of the preforms on the mold cores, and thereafter rotating said turret to present said core holder to a blow position for the blow molding of the plastic articles.

3. The method set forth in claim 2 further including maintaining said core holder in a first position close to said turret during the molding of the preforms on the mold cores at the injection position, and moving said core holder to a second position radially outwardly of said first position during the blow molding of the articles at said blow position.

* * * * *